United States Patent [19]

Weller

[11] 4,218,770
[45] Aug. 19, 1980

[54] DELAY MODULATION DATA TRANSMISSION SYSTEM

[75] Inventor: David R. Weller, Bernardsville, N.J.

[73] Assignee: Bell Telephone Laboratories, Incorporated, Murray Hill, N.J.

[21] Appl. No.: 940,723

[22] Filed: Sep. 8, 1978

[51] Int. Cl.$^2$ ............................................. H04L 7/00
[52] U.S. Cl. ..................................... 375/118; 371/61; 375/110
[58] Field of Search ................... 178/67, 69.1; 325/30, 325/321; 340/146.1 D; 360/51; 328/72, 155

[56] References Cited

U.S. PATENT DOCUMENTS

| | | | |
|---|---|---|---|
| 3,241,067 | 3/1966 | James et al. | 325/41 |
| 3,345,638 | 10/1967 | Christol | 360/42 |
| 3,496,557 | 2/1970 | Lowrance | 360/42 |
| 3,546,592 | 12/1970 | Mayo | 325/321 |
| 3,564,557 | 2/1971 | Ruthazer | 360/51 |
| 3,789,303 | 1/1974 | Hoffman et al. | 325/321 |
| 3,794,987 | 2/1974 | Walenta | 360/43 |
| 3,808,367 | 4/1974 | Wigner et al. | 178/69.1 |
| 3,831,195 | 8/1974 | Davis et al. | 360/51 |
| 3,864,735 | 2/1975 | Davis et al. | 360/51 |
| 3,967,061 | 6/1976 | Dobias | 178/69.1 |

Primary Examiner—Benedict V. Safourek
Attorney, Agent, or Firm—Charles S. Phelan

[57] ABSTRACT

Characteristic signal state patterns in a self-clocking digital code such as delay modulation (DM), or Miller, coding are used to control a data transmission system. A DM signal is examined (16, 17) for a double-bit-rate information state pattern that is characteristic of a non-return-to-zero (NRZ) ONE-ZERO-ONE bit-rate sequence. Detection of the pattern produces a synchronizing pulse that is used to set (20) a clock pulse train to a predetermined signal state. That train is used for sampling (26) time-adjacent, double-bit-rate, input signal, information states in the DM signal to indicate corresponding NRZ states. An NRZ-to-DM encoder (FIG. 7) is also shown, as is one embodiment of each of the encoder (FIG. 10) and decoder (FIG. 11) using read only memory and register logic. Further shown are a detection (46-49) of other double-bit-rate patterns as error indications and a combined use (FIG. 11) of the error and synchronizing indications for end-to-end signaling.

12 Claims, 11 Drawing Figures

FIG. 1 NRZ 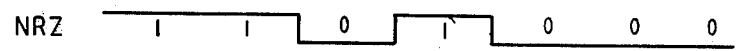
FIG. 2 f CLOCK 
FIG. 3 2f CLOCK 
FIG. 4 DM IN REG 13 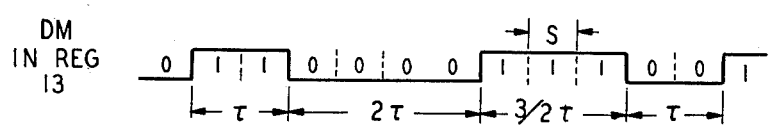
FIG. 5
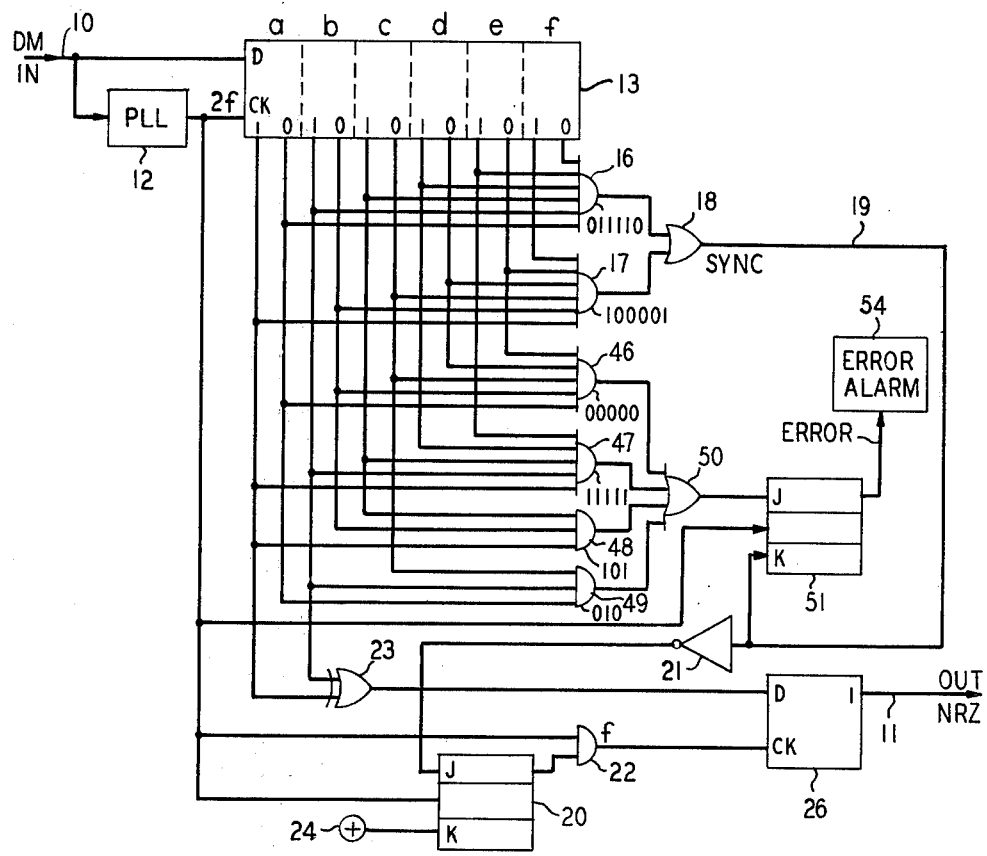

DELAY MODULATION DATA TRANSMISSION SYSTEM

TECHNICAL FIELD

This invention relates to data transmission systems, and it relates more particularly to the use of characteristic signal state patterns, apart from their usual message information significance, for controlling certain transmission system functions.

BACKGROUND OF THE INVENTION

Many different codes are used in data transmission systems, and some require more transmission channel bandwidth than others for the same information transmission rate. One so-called self-clocking code, i.e., a code from which data clock can be recovered, is delay modulation (DM), sometimes called modified frequency modulation (MFM) or Miller coding; and it requires a relatively low bandwidth. It has, therefore, often been used in magnetic recording systems to achieve a relatively high storage packing density. In such use, an associated timing channel is usually provided to assure proper information phase with respect to the system time base because the decoding of DM code is uniquely subject, without close clock tracking, to noise-induced apparent information phase shift that results in ambiguities causing decoding errors.

For example, in an M. F. Davis et al. U.S. Pat. No. 3,864,735, there is shown a coding and decoding arrangement in which a read clock recovery circuit, according to an M. F. Davis et al. U.S. Pat. No. 3,831,195, utilizes a 2-mode phase-locked loop slaved to a clocking track in a magnetic recording medium. The resulting read clock is used in an asymmetrical data window encoder, according to an I. E. Walenta U.S. Pat. No. 3,794,987, to drive monostable multivibrators and tandem flip-flop circuits for converting MFM data to the nonreturn-to-zero (NRZ) format. The relatively narrow bandwidth coding format feature, which facilitates achievement of high density packing in magnetic stores such as that contemplated by Davis et al., is a feature that is also sought in data transmission systems which interface with equipment using other coding formats such as the NRZ format. One such system is an optical data link.

Transmission errors in data transmission systems have been detected by various parity coding schemes and by schemes which do a comparison of multiple transmissions of a single message. These require transmission system facility time and thereby lower the information transmission efficiency.

Data transmission systems also have a need for signaling such as for message synchronization or periodic framing. For example, to initiate a message transmission it is sometimes necessary to employ a time consuming, so-called, handshake procedure in which an alerting signal is sent, a ready signal is returned, and then message transmission begins. On the other hand, systems using a bipolar coding system can transmit polarity violations for certain signaling purposes, but such systems require substantially more channel bandwidth than does delay modulation.

SUMMARY OF THE INVENTION

The foregoing difficulties of data transmission systems are alleviated by an illustrative embodiment of the present invention in which a self-clocking code, such as DM, is utilized; and predetermined, characteristic, double-bit-rate, signal state patterns are utilized for controlling certain transmission system functions. The patterns are utilized as such in addition to any DM information coding significance they may have as well.

In one embodiment, the DM signals are examined at twice the bit-rate to detect characteristic ONE-ZERO signal state patterns corresponding to a bit-rate ONE-ZERO-ONE pattern in the NRZ coding format to synchronize a locally recovered clock signal with information phase in received DM signals.

In another aspect of the invention, different characteristic ONE-ZERO double-bit-rate patterns are detected as indicators of information errors.

A further embodiment combines the synchronization and error indicators for framing signaling between system transmitting and receiving stations.

BRIEF DESCRIPTION OF THE DRAWING

A more complete understanding of the various features, objects, and advantages of the invention may be obtained from a consideration of the following detailed description and the appended claims in connection with the attached drawing in which:

FIGS. 1–4 are timing diagrams illustrating the relationships between DM and NRZ code types and different clock signals for aiding an understanding of the present invention;

FIG. 5 is a logic diagram of a DM to NRZ decoder in accordance with one aspect of the invention;

DETAILED DESCRIPTION

Figure 6:
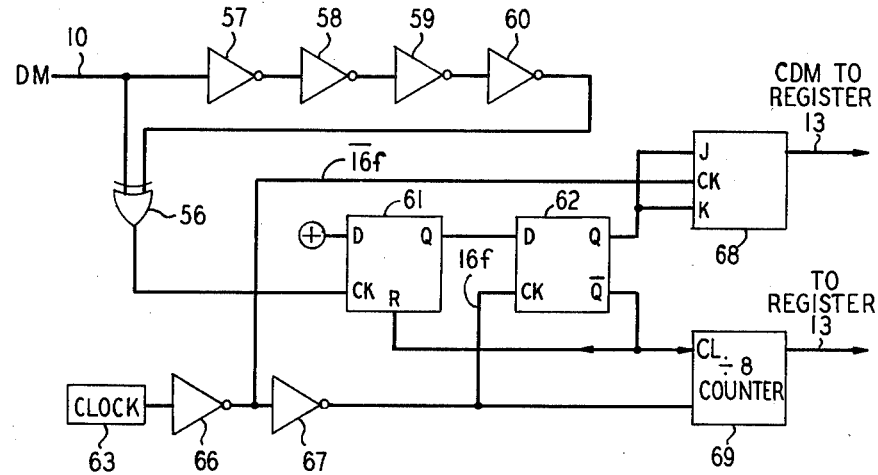
FIG. 6 is a logic diagram of an alternative circuit for processing received signals for use in the FIG. 5 decoder.

FIG. 1 shows an NRZ data bit train including several representative data sequences found in signals for transmitting information in a binary coded format. Binary ONE and ZERO information bit states indicated represent both the high or low, respectively, signal level and the underlying binary coded information bit states.

FIG. 2 is a wave diagram of an f-CLOCK signal which occurs at the bit-rate of the FIG. 1 data and includes a positive-going signal transition at the beginning of each cycle to define the beginning and ending times of each FIG. 1 data bit time.

FIG. 3 is a 2f-CLOCK signal at twice the bit-rate of the FIG. 1 data and having a positive-going transition at each signal level transition of the f-CLOCK signal in either direction.

FIG. 4 is a wave diagram of a DM signal containing the same information, i.e., the same data sequence, as is shown in FIG. 1. Here the binary ONE and ZERO states indicated represent only the high or low, respectively, signal level viewed at twice the transmitted information bit rate. It can be seen by comparing FIGS. 1 and 4 that there are certain features which are characteristic of the DM coding format. Thus, the DM signal has a transition between high and low levels at the time midpoint of each NRZ binary ONE information bit. The DM signal also has a transition between high and low levels at the end of each NRZ binary ZERO information bit except when such a ZERO bit is followed by a binary ONE bit. In the latter case, the DM signal transition does not take place until the time midpoint of that following binary ONE. Consequently, consideration of DM signal level transitions alone leads to ambiguous phase information about the message so that decoding results in gibberish.

In FIG. 4, the character $\tau$ is used to indicate a time period having a duration equal to one bit time in the signal of FIG. 1. In terms of that character, the DM signal experiences a transition between high and low levels at least every $2\tau$ time units. Sometimes transitions occur more frequently as indicated in FIG. 4 where they appear sometimes after $3\tau/2$ time units or after just $\tau$ time units. All three interval sizes are made up of $\tau/2$-intervals, which interval size represents the period of a frequency at twice the bit-rate, i.e., 2f-CLOCK.

It should be noted that the $2\tau$ interval in the FIG. 4 DM signal is centered on the ONE-ZERO-ONE sequence of the FIG. 1 NRZ signal. In that interval, the FIG. 4 wave diagram is continuously in the low, or binary ZERO, signal state. That $2\tau$ interval is bounded by a ONE state on each end within the full ONE-ZERO-ONE of FIG. 1. Thus, there are in FIG. 4 two signal transitions in fixed phase with respect to the FIG. 1 information, and that spacing of transitions is always representative of the same NRZ information sequence regardless of the direction of transition—low to high or high to low. Thus, it will be appreciated by those skilled in the art that, if the central one of the 3 adjacent binary ZEROS in FIG. 1 were changed to a binary ONE, the DM signal of FIG. 4 would then have a similar corresponding $2\tau$ interval in the high, or binary ONE, signal state and bounded by two transitions. This characteristic of the DM signal is utilized, as will be described in connection with FIG. 5, to obtain unambiguous information synchronization for the self-clocking DM signal without the requirement for an associated timing channel.

In FIG. 5, there is shown a decoder in accordance with the present invention. This decoder is advantageously employed at a system receiving station which receives DM signals from a data transmission circuit 10 to decode those signals to the NRZ format for application to an output circuit 11. A commercially available phase-locked loop 12 is advantageously employed to respond to the DM data signal from the circuit 10 by locking to the 2f frequency component thereof and providing at one output the 2f-CLOCK signal of FIG. 3. That signal is applied to the clocking input of a 6-stage shift register 13 which also receives the DM data signal at a data input thereof. The respective stages of shift register 13 are further designated a through f, respectively, from the input stage to the output stage. Since the shift register 13 is clocked at twice the bit rate of the underlying data, the register is capable of containing 6 successive double-bit-rate samples of 3 full bit times of NRZ data.

Two AND gates 16 and 17 each has six input connections from different stages of the shift register 13. The gate 16 is connected to be responsive to coincidence of high signals at the ZERO outputs of stages a and f of register 13 and binary ONE outputs of b through e. On the other hand, gate 17 is responsive to coincidence of binary ONE signals at stages a and f and to binary ZERO signals at stages b through e. Thus, actuation of one of gates 16 or 17 indicates occurrence of the double-bit-rate DM state sequence corresponding to an NRZ 1-0-1. Outputs of gates 16 and 17 are coupled through an OR gate 18 to place SYNC pulses on a lead 19 in response to activation of either the gate 16 or the gate 17 by coincidence of all high input signals on its respective input connections. Each SYNC pulse has a duration equal to the period of the 2f-CLOCK signal in FIG. 3. The letter S in FIG. 4 indicates the approximate time of appearance of a SYNC pulse in response to the detection of the 10001 successive signal states in FIG. 4. The detection of those signal states indicates the occurrence of the NRZ bit sequence ONE-ZERO-ONE in FIG. 1.

A lead 19 and an inverter 21 couple the output of gate 18 to the J input of a J-K flip-flop circuit 20 which is recurrently clocked by the 2f-CLOCK signal from the phase-locked loop 12. The K input is permanently biased high by a positive voltage supply 24 so that when the inverted SYNC signal is high the flip-flop changes state in response to each clock pulse and provides a corresponding pulse train at the f-clock rate at its output. When a SYNC pulse occurs, the corresponding low signal at the J input allows the flip-flop to change only from its set to its reset state, if not there already; and the change takes place on the positive-going edge of the next 2f-CLOCK pulse, i.e., at the end of the S interval in FIG. 4. Thus, the SYNC pulse forces the f-CLOCK to the low state one 2f-CLOCK period after an NRZ 1-0-1 signal sequence thereby establishing a fixed and unambiguous phase relation between the DM information and the f-CLOCK derived therefrom. That forcing action takes place on every SYNC pulse whether it is produced as part of a periodic framing signal or simply as part of received data message information. Forcing such a reset in response to other double-bit-rate patterns has been found to have a characteristic ambiguity of one 2f-CLOCK period so that one cannot be sure whether any particular DM transition represents a ONE or a ZERO.

The binary ONE output of flip-flop circuit 20 is applied to one input of an AND gate 22 which is periodically enabled by the 2f-CLOCK. Thus, the gate 22 produces the f-CLOCK signal retimed to the 2f-CLOCK derived from the incoming DM data.

An EXCLUSIVE OR gate 23 is responsive to like outputs, i.e., the binary ONE outputs of the stages a and b of register 13 to perform a logical EXCLUSIVE OR function on the time adjacent, double-bit-rate, information states of incoming DM data signals. A D-type flip-flop circuit 26 is clocked by the f-CLOCK signal from gate 22 to sample the output of EXCLUSIVE OR gate 23 and provide on lead 11 at the binary ONE output of flip-flop circuit 26 the desired NRZ output signal.

Another aspect of the synchronizing algorithm represented by the FIG. 5 circuit as described so far is that there are some departures from informationally correct, double-bit-rate, characteristic, signal states that represent errors. These can be conveniently detected as invalid patterns without reference to parity and without comparing multiple receptions of a message. These invalid patterns are herein called coding rule, or synchronizing, violations. Such error indications can then be used in the usual ways for system control, e.g., by activating alarms, interrupts, or counters. They are also useful in combination with the SYNC signals for certain transmission system signaling functions as will be subsequently described. It will be appreciated from an examination of FIG. 4 that if more than either four ONE samples or four ZERO samples occur together, the maximum $2\tau$ interval has been violated thereby indicating an error. AND gates 46 and 47 in FIG. 5 detect those conditions, respectively. Similarly, if a double-bit-rate state sequence 101 or 010 occurs, it is a violation of the minimum $\tau$ interval thereby indicating an error; and AND gates 48 and 49 detect those conditions, respectively.

Outputs of gates 46–49 are coupled through an OR gate 50 to a J input of a J-K flip-flop 51 that is clocked by the 2f-CLOCK. The corresponding output of flip-flop 51 is the ERROR signal, and it is available for various uses. The flip-flop is actuated to the K state in the presence of a SYNC pulse following detection of an error.

For applications wherein the incoming DM signals had come from a source employing a precision clock, such as a crystal controlled oscillator, it is desirable to reclock the received signals to a similar precision. To that end the FIG. 6 circuit obtains the 2f-CLOCK and a clocked delay modulation (CDM) signal for the shift register 13. This improves the decoder error rate.

In FIG. 6, the DM signals on lead 10 are applied directly to an EXCLUSIVE OR gate 56, and they are also coupled to another input of that gate through preselected delay, such as the delay of four inverters 57–60. The delay is advantageously much less than one information bit period so that the gate output is a train of narrow pulses, each corresponding to a different signal level transition in the DM signals. Those pulses clock a first edge-triggered D-type flip-flop 61 which has its D input permanently biased to the high signal level. The Q output of flip-flop 61 provides D input to another flip-flop 62 of the same type and which is clocked by a signal 16f, i.e., a signal at a frequency much higher than the DM data bit rate. A crystal clock 63 advantageously provides the 16f signal through inverters 66 and 67.

A $\overline{Q}$ output of flip-flop 62 resets flip-flop 61 so that the Q output of the flip-flop 62 is a train of pulses. Each pulse is of duration equal to the 16f-CLOCK period and delayed an average of one-half period of the 16f-CLOCK from its corresponding DM signal transition. Those pulses from flip-flop 62 are applied to both data inputs of a J-K flip-flop 68 which is clocked by a $\overline{16f}$ signal from inverter 66. The flip-flop 68 connection allows it to change stage only when both J and K inputs are high so that the output is the CDM signal and is applied to the data input of shift register 13.

The 16f signal also drives a synchronous counter 69 to provide the 2f-CLOCK signal for clocking shift register 13 and other purposes in FIG. 5. On each positive-going edge of the 16f-CLOCK pulses the counter is loaded to the all-ZERO state if the $\overline{Q}$ signal from flip-flop 62 is low. Thus, counting is frequently reinitiated to maintain close synchronization between the CDM data and the 2f-CLOCK signals to provide a 2f-CLOCK signal level transition in the middle of a double-bit-rate interval of the CDM signal.

Figure 7:
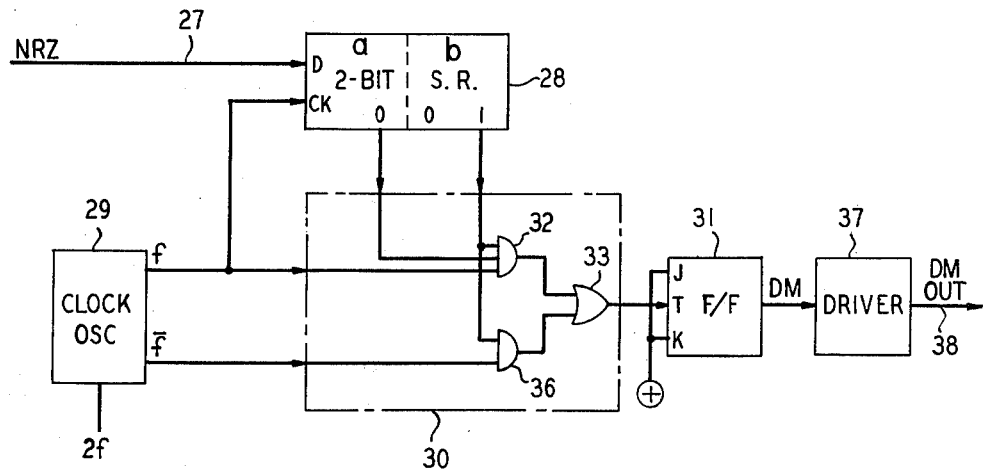
FIG. 7 is a logic diagrams of an NRZ to DM encoder.

FIG. 7 illustrates a circuit for receiving NRZ data and encoding it to a DM format in accordance with a known encoding technique. Thus, the NRZ data is received on a lead 27 and applied to the data input of a 2-bit shift register 28 which is clocked at the data bit-rate, i.e., f-CLOCK, by signals provided from a clock oscillator 29. Synchronizing is usually not a problem for an encoder since it is typically employed at a transmitting station where clocked data is generated in the NRZ format so that the clock frequency and phase are readily available directly, and such arrangements are schematically represented by the clock oscillator 29. Appropriate binary outputs, of the two stages of register 28, are applied to AND/OR logic 30 for generating a toggling signal to a J-K flip-flop 31 which has both data inputs positively biased. That flip-flop produces the DM signal.

In the logic 30, a first AND gate 32 is responsive to the binary ZERO output signals of the two shift register stages when enabled by the f-CLOCK signal from the oscillator 29 to provide a pulse to an OR gate 33 upon detection of high binary ZERO output signals from the two stages. This indicates that successive NRZ binary ZEROS are present and accordingly requires a change in state of the DM output signal at the end of a bit time. Similarly, an AND gate 36 detects a high binary ONE output from the second stage of the register 28 when the gate is enabled by an f signal from oscillator 29, regardless of the state of the first stage of the register, thereby indicating an NRZ binary ONE and requiring a change in state of the DM signal at mid bit time. This operation corresponds to that illustrated in FIGS. 1, 2, and 4 when it is recalled that, when considering any time-adjacent bit pair, the most recently occurring bit of the pair is illustrated to the right in FIG. 1 and to the left in FIG. 7 register 28.

It will be recognized from FIGS. 5 and 7 that the decoder and the coder are made up of flip-flop circuits and basic logic gates. Thus, using known sequential circuit synthesizing, sometimes called state machine design techniques, each is also conveniently reduced to a programmable read only memory (ROM) integrated circuit chip and an interconnected flip-flop register chip. The register chip is recurrently clocked to gate inputs thereto, and it is connected to address the ROM to perform the respective decoding or encoding function depending upon the nature of the various addressable words stored in the ROM.

One paper dealing with such circuit reduction techniques is "A Method for Synthesizing Sequential Circuits" by G. H. Mealy, pages 1045–1079 in *Bell System Technical Journal* of September 1955. However, briefly, the technique involves storing in the ROM clock rate sequential snapshots of circuit states of interest for a particular circuit function, e.g., DM decoding as per FIG. 5. Each of those state words is stored in a word location that can be addressed by the snapshot of a preceding step in the function so that the combination produces the desired overall function as it is clocked. The result is an implementation of the desired function with hardware that is much smaller and much easier to assemble than is the more usual assemblage of discrete logic elements. Snapshot words are logically derived from an actual circuit of the type in FIG. 5, or the circuit can be simulated on a computer programmed to do essentially the same procedure and print out a table of words to be stored.

Figure 8:
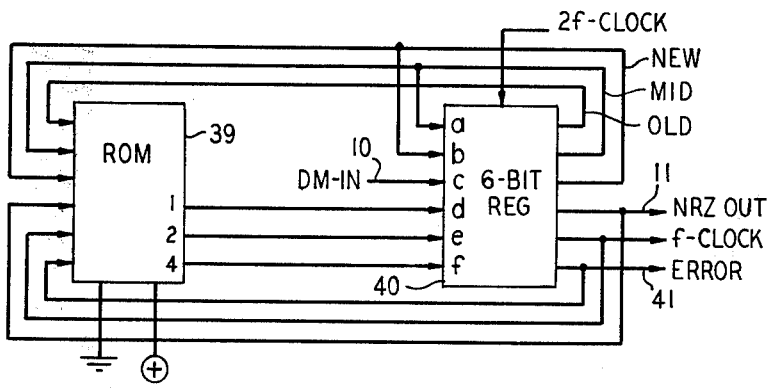
FIGS. 8 and 10 are read-only-memory logic diagram of state machine design implementations of the decoder and encoder of FIGS. 5 and 7, respectively.

FIG. 8 illustrates a decoder in a reduced form obtained by the state machine design technique and corresponding to the decoder of FIG. 5. Here a ROM 39 is provided which is advantageously of a type such as the SN74S287 ROM sold commercially by Texas Instruments, Incorporated. This ROM stores 256 4-bit words, but only three output bits of each of 64 words are utilized so two of the address inputs are connected to ground and a predetermined positive voltage supply. A 6-bit register 40 such as the SN74S174 register of the Texas Instruments, Incorporated is also provided and has stages a-f. This register receives the 2f-CLOCK signal from the phase-locked loop 12 in FIG. 1, and those clock signals periodically enable the loading of the register stages from their indicated respective input connections. Outputs opposite respective inputs are for corresponding respective register stages. One of those input connections, for stage c, is the DM data input lead 10 of FIG. 1, and the corresponding register output is coupled back to provide one of the eight address inputs to the ROM 39 as well as providing the data input to the b stage of the register 40. The corresponding output of the b stage is also coupled back to provide a second address input bit for the ROM 39 and an input to the a stage. The a stage of register 40 has its output coupled back to provide a third one of the ROM address bits.

The three data outputs of the ROM 39 are applied to the inputs of the remaining three stages of register 40, i.e., stages d, e, and f. These stages also have their respective outputs coupled back to provide three additional address bits to the ROM 39. In this arrangement, the d stage of register 40 has its output further coupled to the decoder output lead 11 indicating that it presents the decoder NRZ output. The e and f stage outputs are further coupled to an f-CLOCK lead, sometimes called "phase" and corresponding to the output lead of the gate 22 in FIG. 5, and to an ERROR lead 41, corresponding to the output lead of the flip-flop 51 in FIG. 5.

Figure 9:
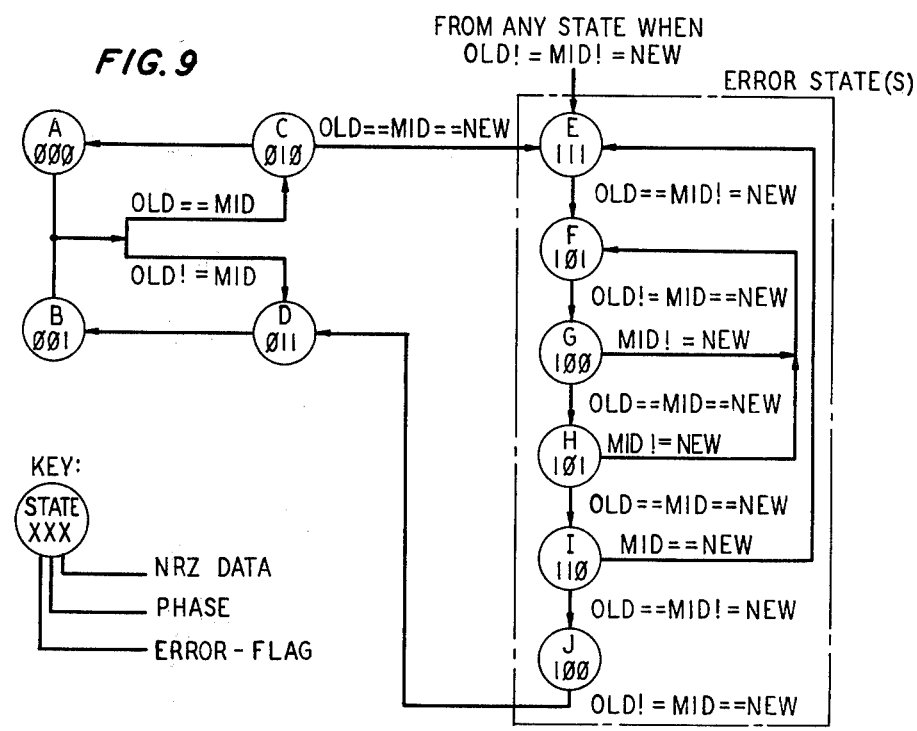
FIG. 9 is a state diagram for the decoder of FIG. 8.

A finite state diagram for the FIG. 8 decoder is shown in FIG. 9 and represents the decoder and the program algorithm for obtaining the ROM contents. The various states are shown in the circles designated by the letters A through J respectively. The portion of the diagram enclosed in the dashed-line box represents the operation in an error state. The 3-digit binary numbers in the respective state circle representations indicate a binary representation of the state in all cases. These binary representations are the same for the states F and H and for the states G and J. Thus, in order to distinguish the states in those two pairs completely, it is necessary also to consider the states of the outputs of the three-stage shift register (stages a-c of register 40). However, further in regard to the states A through D, the binary coded representations have the respective additional significance indicated in the "key" in the drawing. That is, the right-hand bit indicates the state of the NRZ data, the middle bit indicates the state of the f-CLOCK, i.e., the PHASE, and the left-hand bit indicates the state of the error signal, ERROR FLAG.

Alphabetic statements associated with transitions between the states in FIG. 9 specify the shift register bit relationships required for the particular transition involved. For example, in regard to the transition between the states I and J, the statement OLD==MID!-=NEW means that the old bit (stage a in FIG. 8) equals the middle bit (stage b) which in turn does not equal the new bit (stage c).

Transition lines are not shown for the various possible transitions from any of the states A through D and F through J to the state E when the shift register adjacent-bit states differ, that is when OLD!=MID!-=NEW. That condition is an error as already noted in regard to the gates 48 and 49 in FIG. 5.

The FIG. 9 state diagram makes it evident that the shift register bit states (OLD, MID, and NEW) and the state designators (DATA, PHASE, and ERROR FLAG from the other three register stages) define the address of the next state to be addressed in the ROM 39 in FIG. 8. Shown below is a table of 64 words to be stored in that ROM 39 in sequential locations taking the words in the first row from left to right, the second row from left to right, etc. Each word in the table is indicated by an octal-base number representing a three-bit binary coded value word.

2;2;7;3;3;7;2;2
2;2;7;3;3;7;2;2
7;ψ;7;ψ;ψ;7;ψ;7
1;1;7;7;7;7;1;1
5;5;7;3;3;7;5;5
6;5;7;4;4;7;5;6
7;4;7;7;7;7;4;7;
7;5;7;7;7;7;5;7

The decoder is a finite state machine. As already described, one of the three bits of a state is the ERROR FLAG, another the PHASE flag, and the third is the decoded NRZ data out. However the meanings of the last two bits are not significant when the ERROR FLAG is on.

When the machine is not in the error states, the phase toggles on every clock. Information is decoded when the phase is ZERO by comparing the oldest contents of the shift register with the next to oldest (middle). If the two bits are not the same, the data out is set to one, else zero. When the phase is ONE the data is replicated next clock time. The machine is pushed into the error state in two ways. When the machine is in state C and the three bits in the shift register are the same, this means that there were actually four received bits that were the same (because of the condition that leads into state C) and the phase is wrong. The other entry to the error state occurs when the middle bit of the shift register is different from both the others. This single long pulse is an error regardless of what state the machine is in.

When the machine is in the error state, there are only two ways out and they are when the received bits have the pattern 00111100 or 11000011. The counting of the number of bits the same is done by walking through states of the machine. In state F the machine has seen two received bits different from the following one; G, the following two; H, the following three; and I, the following four. In state I, if the next received bit is the same as the prior, that means five received bits in a row were the same; and that is an error; and the machine goes back to state E. If the next received bit is different, the machine goes to state J because it has seen four bits the same and one different. Finally, if in state J the next received bit is the same as the prior one, the machine has verified the above-mentioned sequences so it goes out of the error state (to state D) with the phase and data set properly.

It will be appreciated by those skilled in the art that the stages a-c in FIG. 8 are operated as a 3-stage shift register for the DM input signals. A 6-stage shift register, as in FIG. 5, is not required because the reduced circuit form of FIG. 8 utilizes other aspects of the overall decoder function for providing some of the information contained in additional stages of the FIG. 5 register. For example, ONE and ZERO states of each of the NRZ and ERROR output signals carry certain necessary implications about the composition of the prior double-bit-rate sample sequence composition and make it unnecessary actually to reproduce as many shift register stages in FIG. 8 as are included in FIG. 5.

Figure 10:
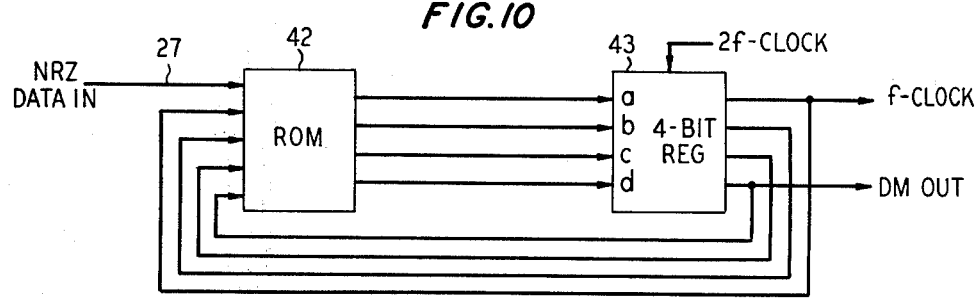

FIG. 10 illustrates an encoder in the ROM and register format and corresponding to the encoder of FIG. 7. In this embodiment, a similar ROM 42 and flip-flop register 43 are employed. However, only 32 of the ROM 4-bit words are employed in FIG. 10. The five address bits for those 32 words include the NRZ data input lead 27, as in FIG. 7, and the four output leads of a 4-stage register 43. Four data output bits from the ROM 42 are applied as input signals to the respective stages of register 43, and signals appearing on those leads are loaded into the register stages periodically in response to gating signals represented by the 2f-CLOCK provided from clock oscillator 29 in FIG. 7. The a stage output of register 43 provides the f-CLOCK signal corresponding to the output f of oscillator 29 in FIG. 7. The b and c stage outputs of register 43 correspond to the two output connections from register 28 to logic 30 in FIG. 7, and the d stage output of register 43 comprises the DM signal output from flip-flop 31 in FIG. 7 and which is applied to the driver 37.

A state diagram for the encoder of FIG. 10 can be readily produced by those skilled in the art. An illustrative set of ROM words for the encoder of FIG. 10 is as follows:

1;1;$\phi$;2;3;3;4;6;
5;5;$\phi$;2;7;7;4;6
1;1;$\phi$;2;3;3;4;6
5;5;$\phi$;2;7;7;4;6

Figure 11:
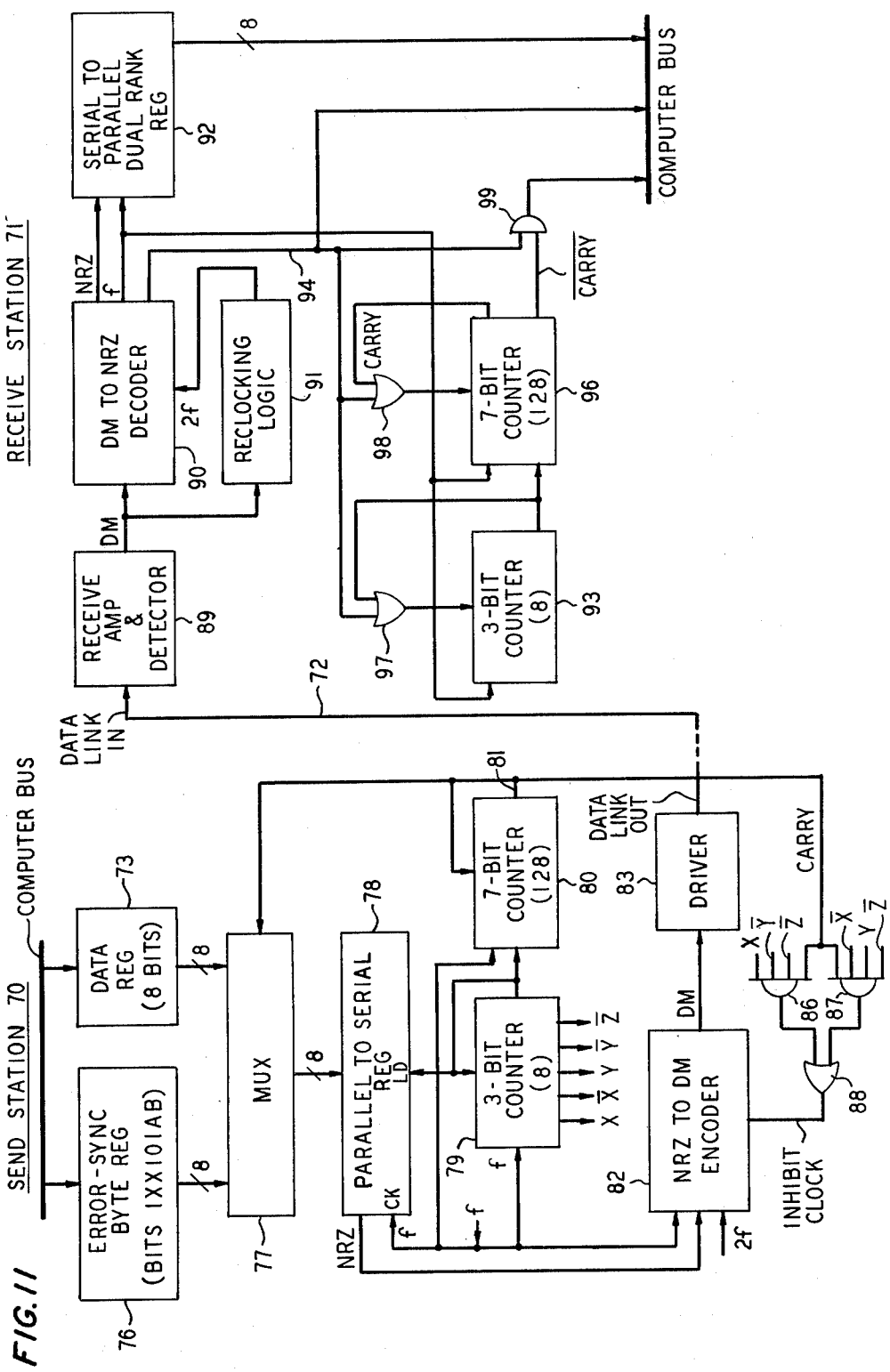
FIG. 11 is a block and line diagram of a data transmission system utilizing the present invention.

In FIG. 11 there is shown a simplified block and line diagram of an illustrative application of double-bit-rate state pattern signaling in accordance with the present invention. A data transmission system is shown utilizing a sending station 70 and a receiving station 71 for communicating in one direction by way of a transmission circuit 72. In such a system it is often useful to signal, e.g., a starting or ending of a message or provide a periodically recurring framing signal. In FIG. 11 signaling, such as that just indicated, is facilitated by transmitting a forced error pattern, i.e., a coding violation, followed immediately, or in some other predetermined sequence, by a synchronizing pattern. Reception of that sequence at a framing time indicates proper framing, and reception of a violation at other times indicates to the receiving station a message error.

A computer (not shown) illustratively communicates by way of a computer bus, in a manner now well known in the art, with a data register 73 and an error-sync byte register 76. Eight-bit data words are supplied to the register 73 as needs require. An eight-bit error sync byte is provided to the register 76 for use as required. The latter byte includes in binary coded representation in three bit times of signal (designated 1xx) designed to include (along with the following ONE bit) a coding violation, e.g., in a double-bit-rate form "1000001". The next three bits include the bits 101 comprising a bit-rate information pattern which produces a double-bit-rate signal state pattern useful for synchronizing as hereinbefore described. The final two bits, designated as A and B, are available for miscellaneous signaling functions.

A multiplexer 77 is controlled by sending station clock signal counters 79 and 80 for interleaving signal words such as, for example, 127 successive words from the register 73 and one error-sync byte from the register 76 in recurring sequence and transferring the respective words as so interleaved to a shift register 78 which is utilized for converting the words to a bit serial format.

A bit rate clock signal f is provided from a source (not separately shown) to drive the counter 79 for producing an output pulse every eight clock times for causing shift register 78 to be reloaded from the multiplexer 77. An overflow feedback connection resets the counter 79 to reset its cycle. The same overflow output of counter 79 drives the counter 80 which divides the signal down by a factor of 128 and which is synchronized to the clock signal f. The overflow, or carry, output of counter 80 appears on a lead 81 and is fed back to recycle the counter; and it is also utilized in other places in the sending station including controlling the multiplexer to select the byte from register 76 after each 127 words from the register 73.

The bit series NRZ output of shift register 78 is supplied to an encoder 82 for converting the digital signal to the DM format, as previously considered in regard to FIG. 7. The output of encoder 82 is applied to the data link 72 through a driver 83 which puts the DM signals into the proper form, e.g., light pulses, for transmission. Two AND gates 86 and 87 are enabled by each carry output signal on the led 81 from counter 80. Gate 86 is actuated by a unity count (indicating the second bit in register 76) from counter 79, by the x, $\bar{y}$, and $\bar{z}$ bit-parallel outputs of the counter, to apply a signal through an OR gate 88 to inhibit, e.g., gates 32 and 36 in FIG. 7 of encoder 82 for one bit time. Similarly, the gate 87 is actuated at a count of two (indicating the third bit in register 76) by the bit-parallel outputs $\bar{x}$, y, and $\bar{z}$ from counter 79 for also inhibiting the gates. These two inhibits produce a double-bit-rate coding violation in the xx bit times and the ONE bit times on each end thereof in the error-sync byte. That is, recalling the arrangements of FIGS. 1 and 4, the NRZ sequence of 1XX1 is made, by the aforementioned encoder inhibits, to appear as the double-bit-rate state sequence of 10000001 which is a violation because it extends for more than 2$\tau$ without a state change.

Signals transmitted via the data link 72 are coupled into the receiving station 71 by way of a receive amplifier and detector 89 for use in a decoder 90 in accordance with, e.g., FIG. 5, and in reclocking logic 91 such as the phase locked loop 12 in FIG. 5. The logic 91 produces the double-bit-rate clock 2f for use in the decoder 90. That decoder produces an f-clock signal (corresponding to the output of gate 22 in FIG. 5), an NRZ data output (corresponding to the output of flip-flop 26), and an error output (corresponding to the output of flip-flop 51) on lead 94. The NRZ data is applied advantageously to a serial-to-parallel dual rank register 92. That register holds each word for one word time to give a receiving station computer (not shown) an opportunity to use it by way of a computer bus.

Receiving station counters 93 and 96 correspond to the sending station counters 79 and 80, respectively, and are driven by the f-clock signal provided by decoder 90. Counters 93 and 96 have their overflow outputs fed back through respective OR gates 97 and 98 for recycling the counters. The OR gates provide an avenue for also resetting both counters in response to each error pulse from the lead 94. A $\overline{\text{CARRY}}$ output of counter 96 is high except during the time that the counter overflows, and that high output is coupled to enable an AND gate 99. The error signal on lead 94 is also applied to gate 99 and the coincidence of those two signals actuates that gate to make available to the receiving station computer a signal indicating that a message error occurred between error-sync byte words. If an error occurs on lead 94 and gate 99 is not actuated, it means that the error was the coding violation included in a properly occurring error-sync byte word.

When the error occurs between such error-sync byte words, the signal is also made available to the computer by way of its bus and provides an early indication of a message error of the coding violation type without the need for more complex error detecting logic. The computer user can then by appropriate software provide for any desired analysis of the error occurrence time or of the particular error pattern since the full data word is available in the register 92. Clearly, by appropriate prearrangement between stations, the different possible types of coding violations included in error-sync bytes could be used as further signaling indicators to be decoded by the receiving station computer.

Although the present invention has been described in connection with particular embodiments thereof, it is to be understood that additional modifications, applications, and embodiments thereof which will be obvious to those skilled in the art are included within the spirit and scope of the invention.

I claim:

1. In a data transmission system for self-clocking digital signals representing binary coded information bits occurring at a predetermined bit rate, the coding of said signals being such that said signals have signal level transitions occurring at a rate less than the information bit rate of the signals and the detection of bit-rate signal states includes a phase ambiguity, the improvement comprising, means for detecting (16, 17, 46-49) in said signals a predetermined double-bit-rate signal level pattern, and means, responsive to an output of said detecting means, for controlling (23, 26) at least one predetermined function of said system.

2. The system in accordance with claim 1 in which means are provided for deriving (12, 20, 22) from said self-clocking signals clock pulses at said predetermined bit rate, and said controlling means comprises means for performing (23) an EXCLUSIVE OR function on time-adjacent double-bit-rate signal samples of said self-clocking signals, and means, responsive to said bit-rate clock pulses, for sampling (26) the output of said EXCLUSIVE OR performing means to reproduce said information in a new coding format.

3. The system in accordance with claim 1 in which means are provided for recovering (12, 20, 22) from said signals a bit-rate clock signal, means, responsive to said clock signal, are provided for converting (23, 26) said self-clocking digital signals to a different binary coded format for the same information, said detecting means comprises means for detecting (16, 17) a predetermined pair of self-clocking signal state transitions indicating a 1-0-1 information bit rate sequence, and said controlling means comprises means for forcing (19, 21) said bit-rate clock signal to a predetermined state in response to detection of said sequence for synchronizing clock and information states.

4. The system in accordance with claim 1 in which said predetermined pattern indicates the occurrence of an error in said signals, and said controlling means includes means, responsive to an error indicating output of said detecting means, for alerting (54) said system to the error occurrence.

5. The system in accordance with claim 1 in which said signals are characterized by having been encoded according to a rule in which at least said one double-bit-rate signal level pattern indicates a 1-0-1 true information bit sequence and predetermined additional ones of said patterns indicate erroneous information state conditions corresponding to information coding rule violations, means are provided for producing (76, 86, 87) sequentially and recurrently an error sync byte including an intentional coding rule violation signal pattern and said one true signal pattern, said detecting means detects both the intentional violation pattern and said true pattern, and said controlling means includes means for indicating (94,99) whether or not the violation pattern occurred in one of said error-sync bytes.

6. The system in accordance with claim 5 in which there are provided a transmitting station (70) including
said producing means, and
means for interleaving (77) one of predetermined different combinations of said true and said violation patterns and with said coded information bits, a receiving station (71) including said detecting means and said controlling means, and means for coupling (72) said transmitting means to said receiving means.

7. The system in accordance with claim 1 in which said signals include inherent time base information including a bit-rate frequency component, said detecting means detects at least one of said predetermined patterns which indicates the occurrence of a predetermined, information, bit-rate, bit sequence which is unambiguously indicative of information phase, and said controlling means comprises means for synchronizing (19, 21) the coded information phase with said time base of said signals.

8. The system in accordance with claim 7 in which said self-clocking signals are delay modulation signals, and said detecting means comprises means for indicating (16, 17) the presence in the delay modulation signals of a double-bit-rate signal state pattern of duration equal to, and no greater than, two information signal bit times, and all of a common signal level, to produce a synchronization pulse for actuating said synchronizing means.

9. The system in accordance with claim 8 in which said indicating means comprises a shift register (13),
means for loading (10, 12) successive double-bit-rate samples of said delay modulation signals into said shift register, and
means for detecting (16, 17) in said shift register the presence of said two-bit-time pattern.

10. The system in accordance with claim 7 in which said self-clocking signals are delay modulation signals, and said detecting means comprises means for indicating (16, 17) the presence in the delay modulation signals of a double-bit-rate signal state pattern of either 100001 or 011110 to produce a synchronization pulse for actuating said synchronizing means.

11. The system in accordance with claim 10 in which said indicating means comprises
   a shift register (13),
   means for loading (10, 12) successive double-bit-rate samples of said delay modulation signals into said shift register, and
   means for detecting (16, 17) in said shift register the presence of either of said 100001 and 011110 patterns.

12. The system in accordance with claim 1 in which said detecting means and said controlling means comprise together
   an addressable memory (39),
   a multistage register (40),
   means for coupling (output leads of 39) a plurality of outputs of said memory to inputs of a first plurality of stages (d-f) of said register,
   means for applying 10 said digital signals to an input of one stage (c) of a second plurality (a-c) of stages of said register,
   means for periodically clocking (2f-CLOCK) said register to enter therein signal states at the inputs of the stages thereof,
   means for interconnecting (leads OLD, MID, NEW) outputs and inputs of said second plurality of stages to effect a shift register function for signals appearing at the input of said one stage as said register is clocked,
   said memory having stored therein a plurality of binary coded signal words defining time-successive states of predetermined steps in the operation of said detecting means and said controlling means, and
   means for coupling (leads OLD, MID, NEW, NRZ, f-CLOCK, ERROR) outputs of said first and second pluralities of register stages to address said memory to read out said state-defining words.

* * * * *